US012670020B2

(12) United States Patent
Lu et al.

(10) Patent No.: US 12,670,020 B2
(45) Date of Patent: Jun. 30, 2026

(54) SYSTEMS AND METHODS FOR GENERATING RUNTIME PREDICTIONS IN DISTRIBUTED COMPUTER ARCHITECTURES

(71) Applicant: JPMORGAN CHASE BANK, N.A., New York, NY (US)

(72) Inventors: Katie Lu, London (GB); Sanket Kamthe, London (GB); Oleg Rasskazov, Upminster (GB); Marta-Diana Filimon, London (GB); Ioana Nistoreanu, London (GB); Sean Moran, London (GB); Andrew Mead, Bicester (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 806 days.

(21) Appl. No.: 17/813,819

(22) Filed: Jul. 20, 2022

(65) Prior Publication Data
US 2024/0028394 A1 Jan. 25, 2024

(51) Int. Cl.
*G06F 9/48* (2006.01)
*G06F 9/50* (2006.01)
*G06F 18/21* (2023.01)

(52) U.S. Cl.
CPC ............ *G06F 9/4887* (2013.01); *G06F 9/505* (2013.01); *G06F 18/2193* (2023.01)

(58) Field of Classification Search
CPC ..... G06F 9/4887; G06F 18/2193; G06F 9/505
See application file for complete search history.

(56) References Cited

U.S. PATENT DOCUMENTS

| | | | | |
|---|---|---|---|---|
| 10,489,215 B1 * | 11/2019 | Wen | ........................... | G06F 9/50 |
| | | | | 718/104 |
| 11,410,111 B1 * | 8/2022 | Washam | ................ | G06N 20/00 |
| | | | | 705/35 |
| 2019/0146811 A1 * | 5/2019 | Pell | ........................... | G06N 5/02 |
| | | | | 713/100 |
| 2022/0035670 A1 * | 2/2022 | Ugalde Diaz | ......... | G06F 9/4881 |
| | | | | 718/104 |
| 2023/0020590 A1 * | 1/2023 | Pendharkar | ........ | G06Q 30/0206 |
| | | | | 705/38 |

* cited by examiner

*Primary Examiner* — Aimee Li
*Assistant Examiner* — Harrison Li
(74) *Attorney, Agent, or Firm* — GREENBERG TRAURIG LLP

(57) ABSTRACT

Systems and methods for generating runtime predictions in distributed computer architectures are disclosed. According to one embodiment, a method for generating runtime predictions in a distributed computer architectures may include: (1) receiving, by a runtime prediction computer program executed by an electronic device, training data regarding completion of a plurality of risk compute jobs; (2) extracting, by the runtime prediction computer program, bucketing statistics and instrument level features from the data; (3) training, by the runtime prediction computer program, a machine learning model with the training data, the extracted bucketing statistics, and the instrument level features; (4) receiving, by the runtime prediction computer program, a plurality of jobs for a period of time; and (5) calculating, by the runtime prediction computer program, an instrument cost for each of the jobs using the machine learning model.

14 Claims, 4 Drawing Sheets

Computer program uses ElasticNet Model regression
(305)

Identify feature weights from ElasticNet model regression
(310)

Save feature weights to a database
(315)

Estimate instrument cost
(320)

Separate weighted instruments into groups
(325)

Persist groups to cloud
(330)

SYSTEMS AND METHODS FOR GENERATING RUNTIME PREDICTIONS IN DISTRIBUTED COMPUTER ARCHITECTURES

BACKGROUND OF THE INVENTION

1. Field of the Invention

Embodiments relate generally to systems and methods for generating runtime predictions in distributed computer architectures.

2. Description of the Related Art

Determining an end of the day risk compute or workload is difficult and highly dependent on context. For example, different grouping mechanisms can result in substantial variations in the calculated run times of the workloads. Current methods often miscalculate the runtimes of the workload, resulting in long running jobs that may impact Service Level Agreements (SLAs) and high compute cost paid to cloud service provider.

SUMMARY OF THE INVENTION

Systems and methods for generating runtime predictions in distributed computer architectures are disclosed. According to one embodiment, a method for generating runtime predictions in a distributed computer architectures may include: (1) receiving, by a runtime prediction computer program executed by an electronic device, training data regarding completion of a plurality of risk compute jobs; (2) extracting, by the runtime prediction computer program, bucketing statistics and instrument level features from the data; (3) training, by the runtime prediction computer program, a machine learning model with the training data, the extracted bucketing statistics, and the instrument level features; (4) receiving, by the runtime prediction computer program, a plurality of jobs for a period of time; and (5) calculating, by the runtime prediction computer program, an instrument cost for each of the jobs using the machine learning model.

In one embodiment, the bucketing statistics may include one or more of a task level calculation time, instrument names, and a unique hash key indicating how each task is scheduled and distributed on a cloud compute infrastructure.

In one embodiment, the instrument level features may include one or more of market dependencies, instrument types, and instrument maturities.

In one embodiment, the machine learning model may be trained using the ElasticNet model for linear regression with cross validation.

In one embodiment, the method may also include routing, by the runtime prediction computer program, one or more of the plurality of jobs to low-cost cloud processing in response to the instrument cost being below a threshold.

In one embodiment, the method may also include routing, by the runtime prediction computer program, one or more of the plurality of jobs to high-cost cloud processing in response to the instrument cost being above a threshold.

In one embodiment, the ElasticNet model regression may identify a feature weight for each instrument from the training data.

In one embodiment, the method may also include grouping, by the runtime prediction computer program, the instruments based on their feature weights.

According to another embodiment, a system may include a data source comprising data regarding completion of a plurality of risk compute jobs and an electronic device executing a runtime prediction computer program and a machine learning model. The runtime prediction computer program may receive training data regarding completion of the plurality of risk compute jobs, extract bucketing statistics and instrument level features from the data, train the machine learning model with the training data, the extracted bucketing statistics, and the instrument level features, receive a plurality of jobs for a period of time, and calculate an instrument cost for each of the jobs using the machine learning model.

In one embodiment, the bucketing statistics may include one or more of a task level calculation time, instrument names, and a unique hash key indicating how each task is scheduled and distributed on a cloud compute infrastructure.

In one embodiment, the instrument level features may include one or more of market dependencies, instrument types, and instrument maturities.

In one embodiment, the machine learning model may be trained using the ElasticNet model for linear regression with cross validation.

In one embodiment, the runtime prediction computer program may route one or more of the plurality of jobs to low-cost cloud processing in response to the instrument cost being below a threshold.

In one embodiment, the runtime prediction computer program may route one or more of the plurality of jobs to high-cost cloud processing in response to the instrument cost being above a threshold.

In one embodiment, the ElasticNet model regression may identify a feature weight for each instrument from the training data.

In one embodiment, the runtime prediction computer program may group the instruments based on their feature weights.

According to another embodiment, a non-transitory computer readable storage medium, may include instructions stored thereon, which when read and executed by one or more computer processors, cause the one or more computer processors to perform steps comprising: receiving training data regarding completion of a plurality of risk compute jobs; extracting bucketing statistics and instrument level features from the data, wherein the bucketing statistics comprise one or more of a task level calculation time, instrument names, and a unique hash key indicating how each task is scheduled and distributed on a cloud compute infrastructure and the instrument level features comprise one or more of market dependencies, instrument types, and instrument maturities; training a machine learning model with the training data, the extracted bucketing statistics, and the instrument level features, wherein the machine learning model is trained using the ElasticNet model for linear regression with cross validation; receiving a plurality of jobs for a period of time; and calculating an instrument cost for each of the jobs using the machine learning model.

In one embodiment, the non-transitory computer readable storage medium may also include instructions stored thereon, which when read and executed by one or more computer processors, cause the one or more computer processors to route one or more of the plurality of jobs to low-cost cloud processing in response to the instrument cost being below a threshold.

In one embodiment, the non-transitory computer readable storage medium may also include instructions stored thereon, which when read and executed by one or more computer processors, cause the one or more computer processors to route one or more of the plurality of jobs to high-cost cloud processing in response to the instrument cost being above a threshold.

In one embodiment, the non-transitory computer readable storage medium may also include instructions stored thereon, which when read and executed by one or more computer processors, cause the one or more computer processors to group the instruments based on their feature weights.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for generating runtime predictions in distributed computer architectures.

Embodiments may use a trained machine learning model to predict runtimes based on historical data. For example, features may be collected at the instrument level. The features may include instrument type, maturity, market dependencies, etc., and then may be aggregated at a task level.

For example, embodiments may predict instrument level costs; instrument costs are used by Juno scheduling to allocate instruments to each compute task. The cost is a direct approximation of how long it takes to price each instrument. Therefore, by fixing the task size, embodiments may distribute instruments in a more evenly manner in terms of overall compute time. An instrument may represent a derivative contract or security, on a per-unit basis. Instruments have stored values that define the contract terms, for example, strike price, expiration date, and so on.

To enable deployment in the distributed scheduling system, embodiments may calculate feature-wise weights and use the feature-wise weights to predict instrument level costs. The instrument cost may be used to approximate task runtime.

In one embodiment, the machine learning solution may automatically adapt to different risk measurements, a trading portfolio's position variations, and changing deployment strategies.

Figure 1:
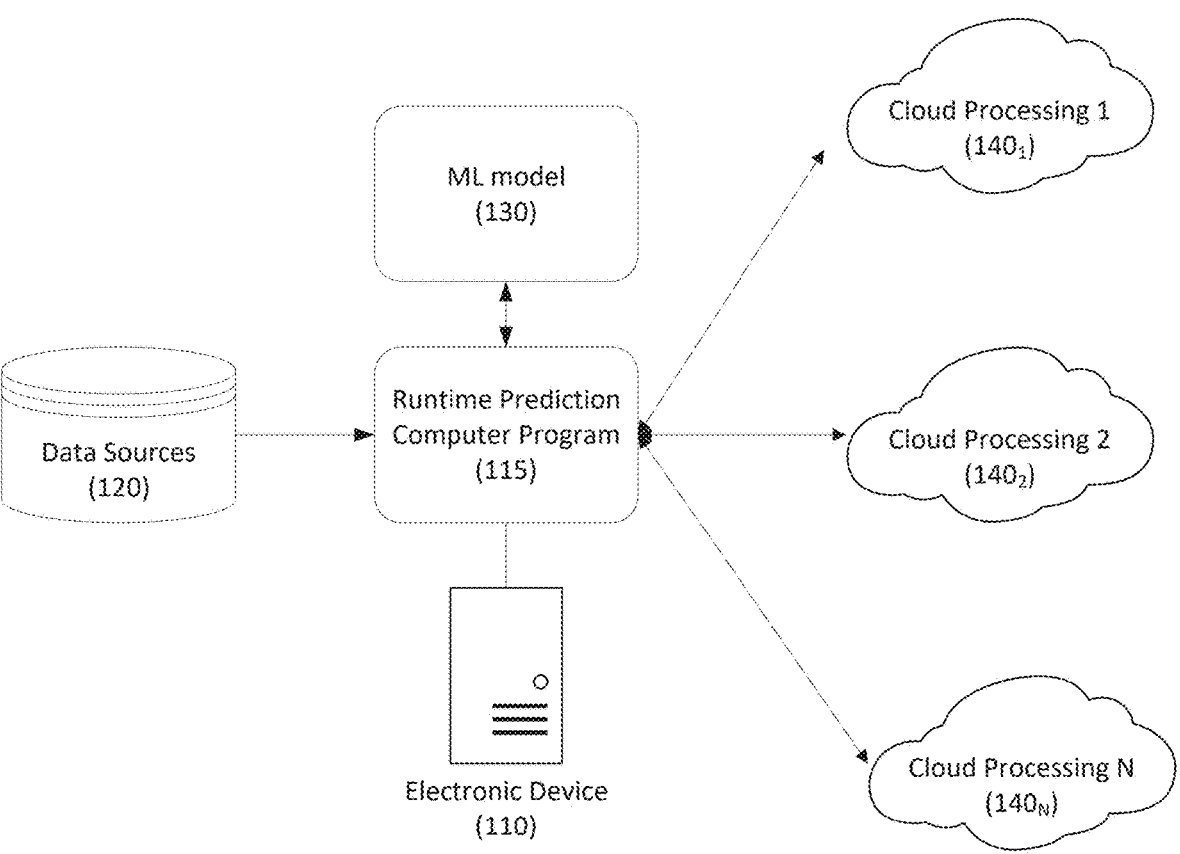
FIG. 1 depicts a system for generating runtime predictions in distributed computer architectures according to an embodiment.

Referring to FIG. 1, a system for generating runtime predictions in distributed computer architectures is disclosed according to an embodiment. The system may include electronic device 110 that may be any suitable electronic device, including servers (physical and/or cloud-based), workstations, computers (e.g., desktop, laptop, tablet, etc.), etc. Electronic device 110 may execute runtime prediction computer program 115 that may receive data from data source(s) 120 and train machine learning model 130. Runtime prediction computer program 115 may predict the runtime for a task or process to be executed by one of a plurality of cloud processing services (e.g., cloud processing $140_1$, cloud processing $140_2$, cloud processing $140_N$). Each of cloud processing services 140 may provide processing at a different service level and price. For example, cloud processing $140_1$ may provide uninterrupted processing, while cloud processing $140_2$ may provide reduced-price processing when surplus processing capacity is available, but the processing may be interrupted if a higher-priority job is received.

Figure 2:
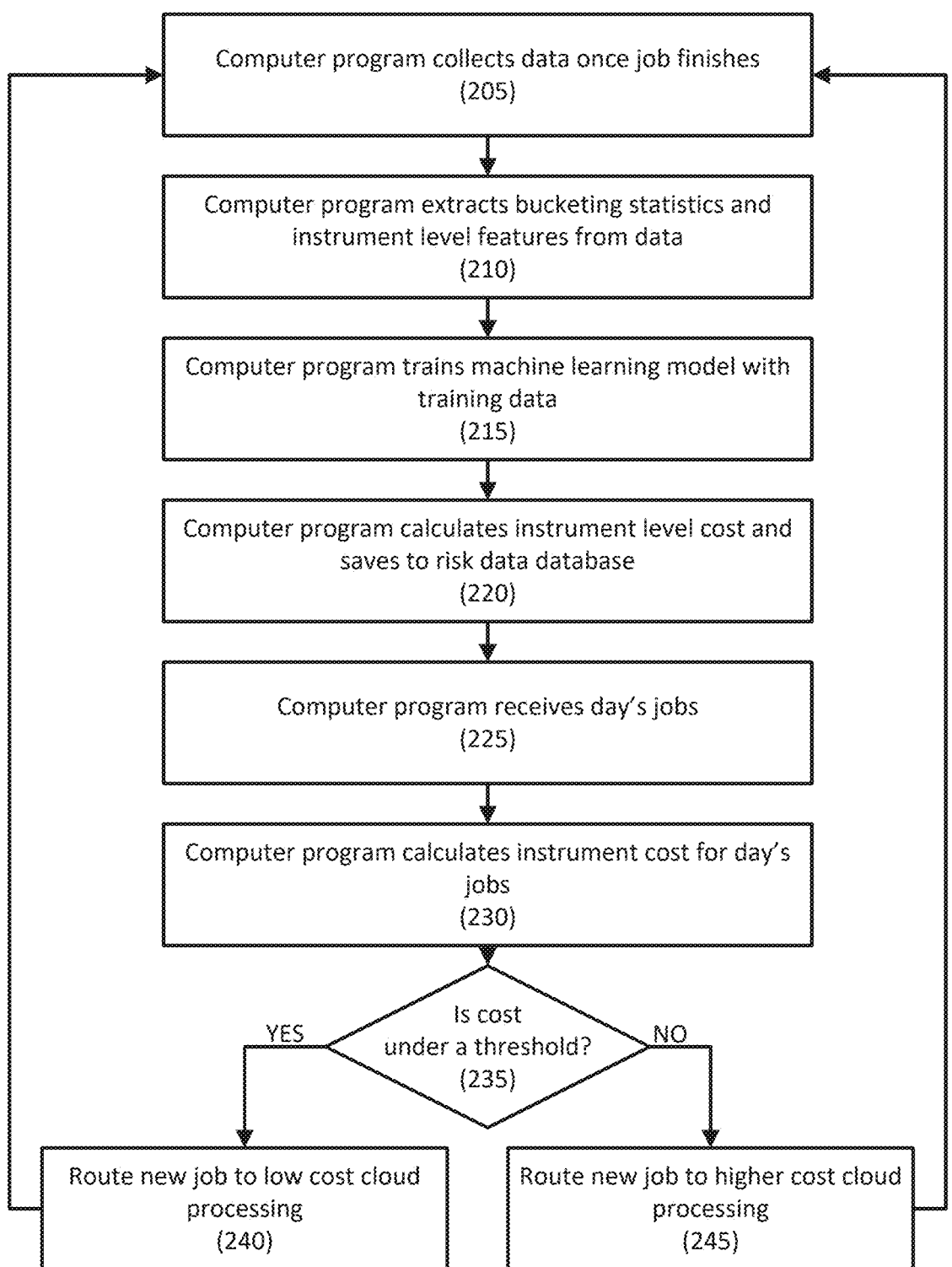
FIG. 2 depicts a method for generating runtime predictions in distributed computer architectures according to an embodiment.

Referring to FIG. 2, a method for generating runtime predictions in distributed computer architectures is disclosed according to an embodiment. In one embodiment, in step 205, a runtime prediction computer program may receive data regarding the completion of a risk compute job. In one embodiment, the data may include bucketing statistics and instrument level features.

In step 210, the runtime prediction computer program may extract bucketing statistics and instrument level features from the data. Bucketing statistics may include task level calculation time, instrument names, and a unique hash key indicating how each task is scheduled and distributed on the cloud compute infrastructure.

Instrument level features may include market dependencies, types, maturities, etc. Market dependencies may represent a collection of risk factors which an instrument may be exposed to. For example, for a typical single currency interest rate swap, an instrument may be exposed to risk factors such as currency (used for dollarization), index curve (used for estimation), and credit support annex curve (used for discounting). Each type of risk factor may require a distinct curve build, leading to different and distinguishable compute times.

Maturities may represent a finite time period at the end of which the financial instrument will cease to exist, and the principal is repaid with interest. Maturities may impact on the compute time for certain instruments, such as options.

Type may represent the instrument type, such as cash flow, swaps, options, etc. Any other suitable instrument type may be used as is necessary and/or desired. Type provides a more implicit and broader categorization to differentiate instruments in terms of compute times, for example, cash flow type of instruments generally requires less compute time than swaps or options.

In step 215, the runtime prediction computer program may train a machine learning model with training data, the extracted bucketing statistics, and the instrument level features. For example, the training data may be received over a period of time (e.g., days, weeks, etc.) In one embodiment, the machine learning model may be trained using the ElasticNet model for linear regression with cross validation. In one embodiment, the machine learning model may be trained using any suitable amount of data, such as one day's data, a week's data, a month's data, etc. In one embodiment, the machine learning model may be trained periodically using rolling data.

Figure 3:
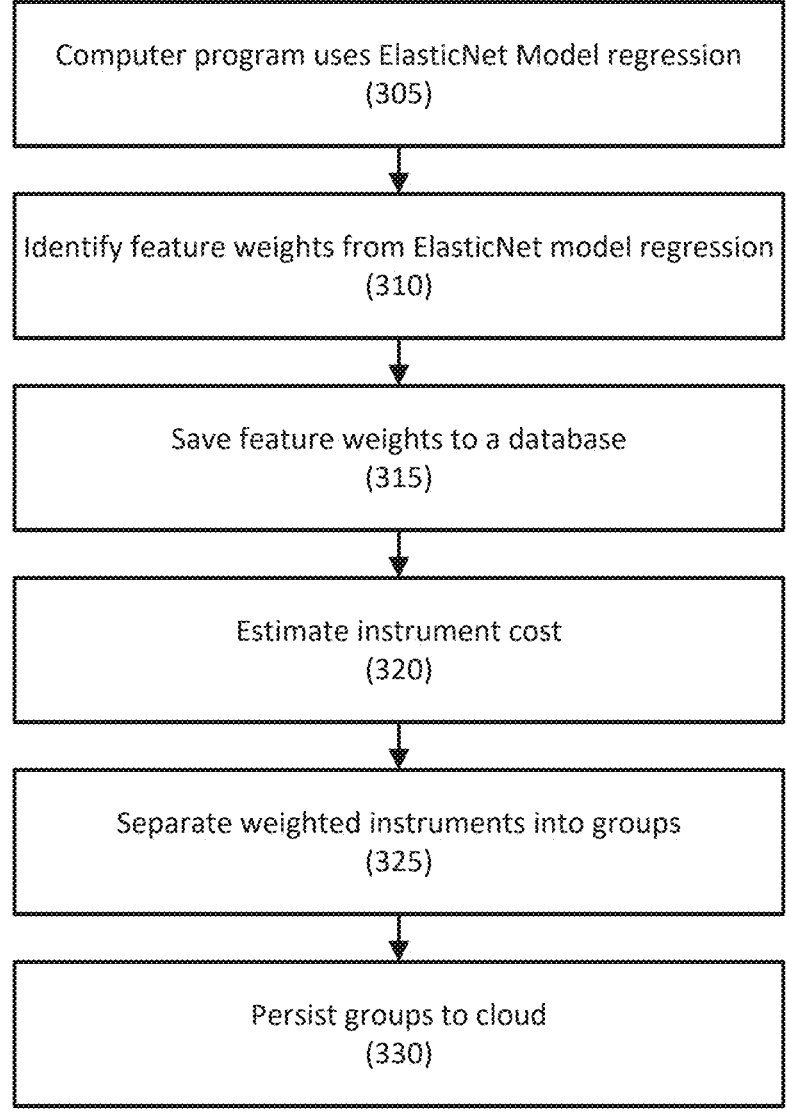
FIG. 3 depicts a method of training a machine learning model according to an embodiment.

Referring to FIG. 3, an exemplary method of training a machine learning model of step 215 is provided. In step 305, the runtime prediction computer program may use ElasticNet model regression on the trained model. The ElasticNet model may be represented as: $y = a + b_1 x_1 + b_2 x_2 + \ldots + b_n x_n$, where $x_n$ is denoted as the task level aggregated feature count, and $b_n$ is denoted as the feature weight, and y is the task level runtime, a is the intercept of the linear model (e.g., the fixed overhead time per task regardless of the instrument constitutions).

In step 310, the runtime prediction computer program may identify the feature weight ($b_n$) from the ElasticNet model regression and, in step 315, may store the feature weight in a database.

In step 320, the runtime prediction computer program may use the feature weight $b_n$ to estimate an instrument cost. The use of the feature weight $b_n$ is key to estimate how long it would take to price an instrument under certain risk measure for a particular market condition. Given that the feature weight $b_n$ is meant to be naturally agnostic to instruments, therefore, the set of feature weight is then preserved in the database so that it can be used to predict new instruments which the model has not seen before, as long as the instrument level feature of this new instrument is known to the model.

Other machine learning techniques that may be used in the model include GridSearch and CountVectorization. GridSearch exhaustively generates candidates from a grid of hyper-parameter values and return the optimized set of hyper-parameters which maximize the prediction power or minimize the error. CountVectorization may be used to automatically process market dependencies, on the basis of the frequency (count) of each word that occurs in the entire list.

In step 325, the runtime prediction computer program may separate the weighted instruments into groups, and in step 330, may make the groups available by persisting them to, for example, the cloud.

Referring again to FIG. 2, in step 220, the runtime prediction computer program may calculate an instrument level cost based on the trained machine learning model. The runtime prediction computer program may store the instrument level cost in the database, and the instrument level cost may then be used by a scheduling process to distribute in a more predictable manner to ensure the compute time is more evenly distributed.

In step 225, the runtime prediction computer program may receive jobs scheduled for a time period, such as a day.

In step 230, the runtime prediction computer program may calculate an instrument cost, such as the runtime, for the jobs using the trained model. The instrument costs may be calculated at the job level, or for combinations of jobs.

The instrument cost may the stored and then used for future calculations, such as the next day's calculations.

In step 235, if the instrument cost for a job or jobs is under a threshold, indicating that the job has a runtime that is likely to be completed by low-cost cloud processing without interruption, in step 240, the runtime prediction computer program may route the job to low-cost cloud processing.

In step 235, if the instrument cost is over the threshold, indicating that one or more of the jobs has a runtime that is unlikely to be completed by low-cost cloud processing without interruption, in step 245, the runtime prediction computer program may route one or more of the jobs to higher-cost cloud processing.

The process may then repeat.

Figure 4:
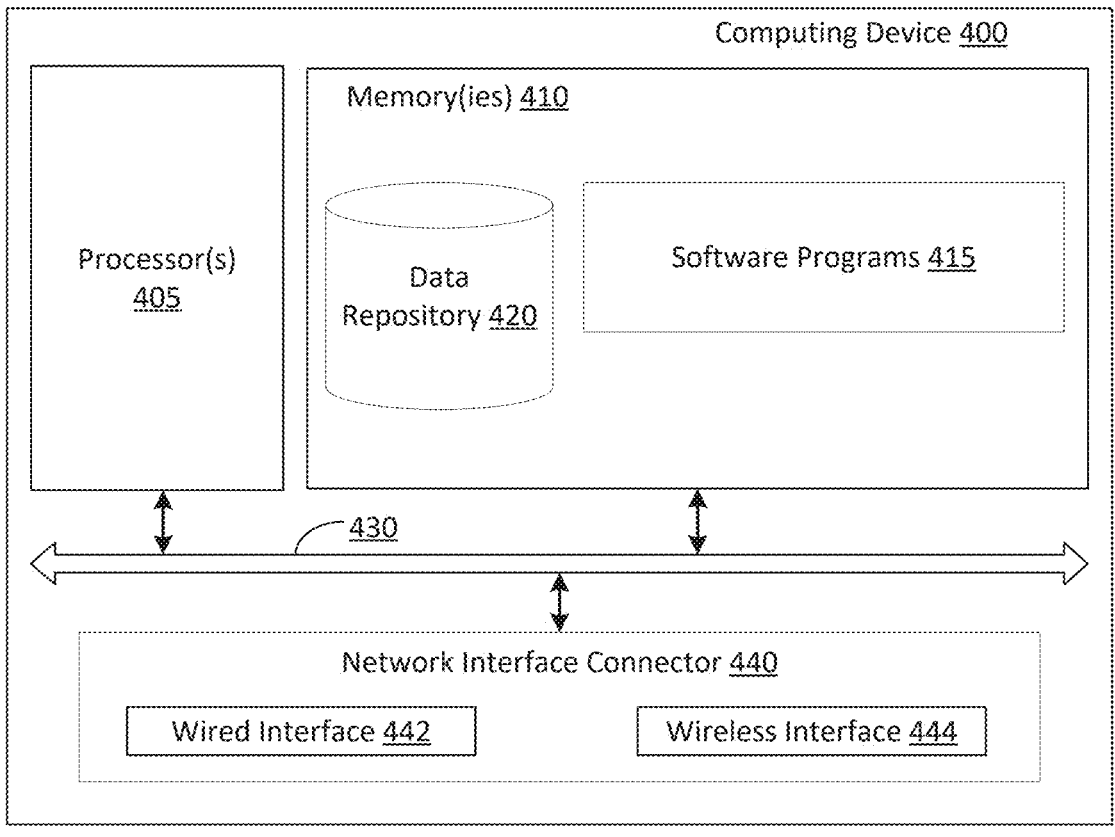
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating runtime predictions in distributed computer architectures, comprising:

receiving, by a runtime prediction computer program executed by an electronic device, training data regarding completion of a plurality of risk compute jobs;

extracting, by the runtime prediction computer program, bucketing statistics and instrument level features from the training data;

aggregating, by the runtime prediction computer program, the instrument level features a plurality of instruments from the training data at a task level to generate a task level aggregated feature count;

training, by the runtime prediction computer program, a machine learning model with the training data, the extracted bucketing statistics, and the instrument level features, wherein the extracted bucketing statistics comprise one or more of a task level calculation time, instrument names, and a unique hash key indicating how each task is scheduled and distributed on a cloud compute infrastructure, wherein the machine learning model is trained using an ElasticNet model for linear regression with cross validation, wherein the ElasticNet model for linear regression determines a feature weight for each instrument of the plurality of instruments from the training data multiplied by the task level aggregated feature count;

storing, by the runtime prediction computer program on a database, the feature weight for each instrument of the plurality of instruments from the training data;

receiving, by the runtime prediction computer program, a plurality of jobs for a period of time;

calculating, by the runtime prediction computer program, an instrument cost for each of the plurality of jobs using the machine learning model upon determining the instrument level feature of the plurality of jobs is known to the machine learning model;

retraining, by the runtime prediction computer program, the machine learning model periodically using rolling data; and distributing, by a scheduling process executed on the cloud compute infrastructure, one or more instruments of the plurality of instruments to at least one job of the plurality of jobs based on the instrument cost.

2. The method of claim 1, wherein the instrument level features comprise one or more of market dependencies, instrument types, and instrument maturities.

3. The method of claim 1, further comprising:

routing, by the runtime prediction computer program, one or more of the plurality of jobs to low-cost cloud processing in response to the instrument cost being below a threshold.

4. The method of claim 1, further comprising:

routing, by the runtime prediction computer program, one or more of the plurality of jobs to high-cost cloud processing in response to the instrument cost being above a threshold.

5. The method of claim 1, further comprising:

grouping, by the runtime prediction computer program, the instruments based on their feature weights.

6. A system, comprising:

a data source comprising data regarding completion of a plurality of risk compute jobs; and an electronic device executing a runtime prediction computer program and a machine learning model, wherein:

the runtime prediction computer program receives training data regarding completion of the plurality of risk compute jobs;

the runtime prediction computer program extracts bucketing statistics and instrument level features from the training data, wherein the bucketing statistics comprise one or more of a task level calculation time, instrument names, and a unique hash key indicating how each task is scheduled and distributed on a cloud compute infrastructure;

the runtime prediction computer program aggregates, by the runtime prediction computer program, the instrument level features a plurality of instruments from the training data at a task level to generate a task level aggregated feature count;

the runtime prediction computer program trains the machine learning model with the training data, the extracted bucketing statistics, and the instrument level features, wherein the machine learning model is trained using an ElasticNet model for linear regression with cross validation, wherein the ElasticNet model for linear regression determines a feature weight for each instrument of the plurality of instruments from the training data multiplied by the task level aggregated feature count;

the runtime prediction computer program stores on a database the feature weight for each instrument of the plurality of instruments from the training data;

the runtime prediction computer program receives a plurality of jobs for a period of time;

the runtime prediction computer program calculates an instrument cost for each of the plurality of jobs using the machine learning model upon determining the instrument level feature of the plurality of jobs is known to the machine learning model;

the runtime prediction computer program, retrains the machine learning model periodically using rolling data; and a scheduling process executed on the cloud compute infrastructures distributes one or more instruments of the plurality of instruments to at least one job of the plurality of jobs based on the instrument cost.

7. The system of claim 6, wherein the instrument level features comprise one or more of market dependencies, instrument types, and instrument maturities.

8. The system of claim 6, wherein the runtime prediction computer program routes one or more of the plurality of jobs to low-cost cloud processing in response to the instrument cost being below a threshold.

9. The system of claim 6 wherein the runtime prediction computer program routes one or more of the plurality of jobs to high-cost cloud processing in response to the instrument cost being above a threshold.

10. The system of claim 6, wherein the runtime prediction computer program groups the instruments based on their feature weights.

11. A non-transitory computer readable storage medium, including instructions stored thereon, which when read and executed by one or more computer processors, cause the one or more computer processors to perform steps comprising:

receiving training data regarding completion of a plurality of risk compute jobs;

extracting bucketing statistics and instrument level features from the training data, wherein the bucketing statistics comprise one or more of a task level calculation time, instrument names, and a unique hash key indicating how each task is scheduled and distributed on a cloud compute infrastructure and the instrument level features comprise one or more of market dependencies, instrument types, and instrument maturities;

training a machine learning model with the training data, the extracted bucketing statistics, and the instrument level features, wherein the machine learning model is trained using an ElasticNet model for linear regression with cross validation, wherein the ElasticNet model for linear regression determines a feature weight for each instrument of the plurality of instruments from the training data multiplied by the task level aggregated feature coun;

storing on a database the feature weight for each instrument of the plurality of instruments from the training data;

receiving a plurality of jobs for a period of time;

calculating an instrument cost for each of the plurality of jobs using the machine learning model upon determining the instrument level feature of the plurality of jobs is known to the machine learning model; and retraining, by the runtime prediction computer program, the machine learning model periodically using rolling data; and distributing, by a scheduling process executed on the cloud compute infrastructures, one or more instruments of the plurality of instruments to at least one job of the plurality of jobs based on the instrument cost.

12. The non-transitory computer readable storage medium of claim 11, further comprising instructions stored thereon, which when read and executed by one or more computer processors, cause the one or more computer processors to perform steps comprising:

routing one or more of the plurality of jobs to low-cost cloud processing in response to the instrument cost being below a threshold.

13. The non-transitory computer readable storage medium of claim 11, further comprising instructions stored thereon, which when read and executed by one or more computer processors, cause the one or more computer processors to perform steps comprising:

routing, by the runtime prediction computer program, one or more of the plurality of jobs to high-cost cloud processing in response to the instrument cost being above a threshold.

14. The non-transitory computer readable storage medium of claim 11, further comprising instructions stored thereon, which when read and executed by one or more computer processors, cause the one or more computer processors to perform steps comprising:

grouping, by the runtime prediction computer program, the instruments based on their feature weights.

* * * * *